United States Patent [19]

Ugo

[11] 4,041,647
[45] Aug. 16, 1977

[54] APPARATUS FOR IMPROVING TIRE UNIFORMITY

[75] Inventor: John Walter Ugo, Warren, Mich.

[73] Assignee: Uniroyal, Inc., New York, N.Y.

[21] Appl. No.: 647,297

[22] Filed: Jan. 7, 1976

Related U.S. Application Data

[62] Division of Ser. No. 491,979, July 26, 1974, Pat. No. 3,963,427.

[51] Int. Cl.² .............................................. B24B 5/00
[52] U.S. Cl. .............................. 51/106 R; 51/165 R; 51/DIG. 33
[58] Field of Search ............ 51/165 R, 165.91, 106 R, 51/DIG. 33

[56] References Cited

U.S. PATENT DOCUMENTS

| | | | |
|---|---|---|---|
| 3,543,576 | 12/1970 | Bishop | 51/DIG. 33 |
| 3,556,194 | 1/1971 | Farrington | 51/DIG. 33 |
| 3,724,137 | 4/1973 | Hofelt | 51/106 R |
| 3,841,033 | 10/1974 | Appleby | 51/289 R |

Primary Examiner—Harold D. Whitehead
Attorney, Agent, or Firm—Lawrence E. Sklar

[57] ABSTRACT

A method and apparatus for improving tire uniformity with respect to radial force variation and free radial run-out is disclosed. The method comprises continuously rotating the tire about its own rotational axis under a constant normal load, measuring the variation in the forces generated in the radial direction around the circumference of the tire tread, grinding either or both tread shoulders to correct excessive variation in the radial forces, measuring the variation in the free radial run-out of the tire tread around the circumference along both shoulders and the centers thereof, and grinding either or both shoulders and/or the center of said tire tread to correct excessive variation in the free radial run-out of the tire.

8 Claims, 7 Drawing Figures

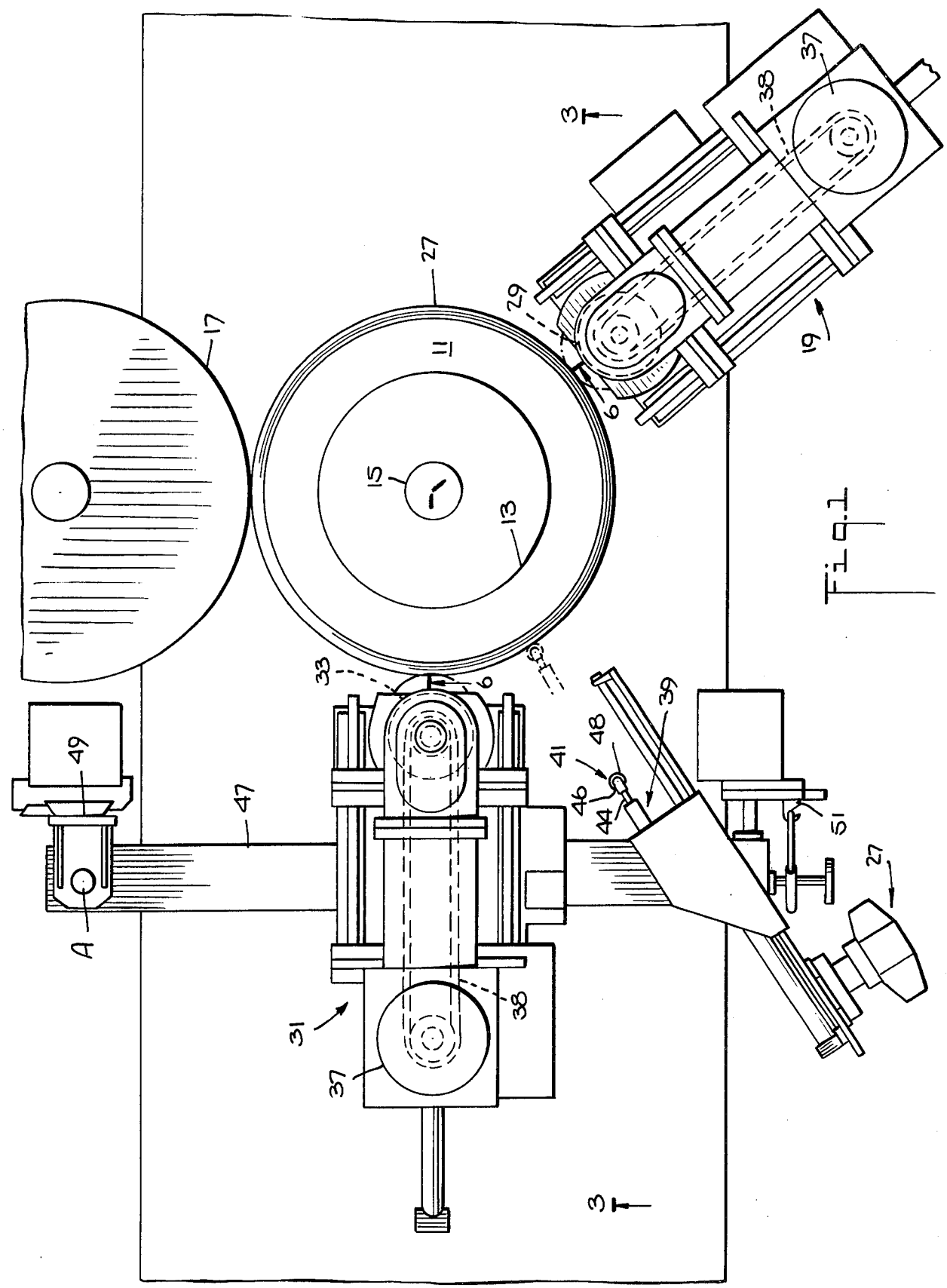

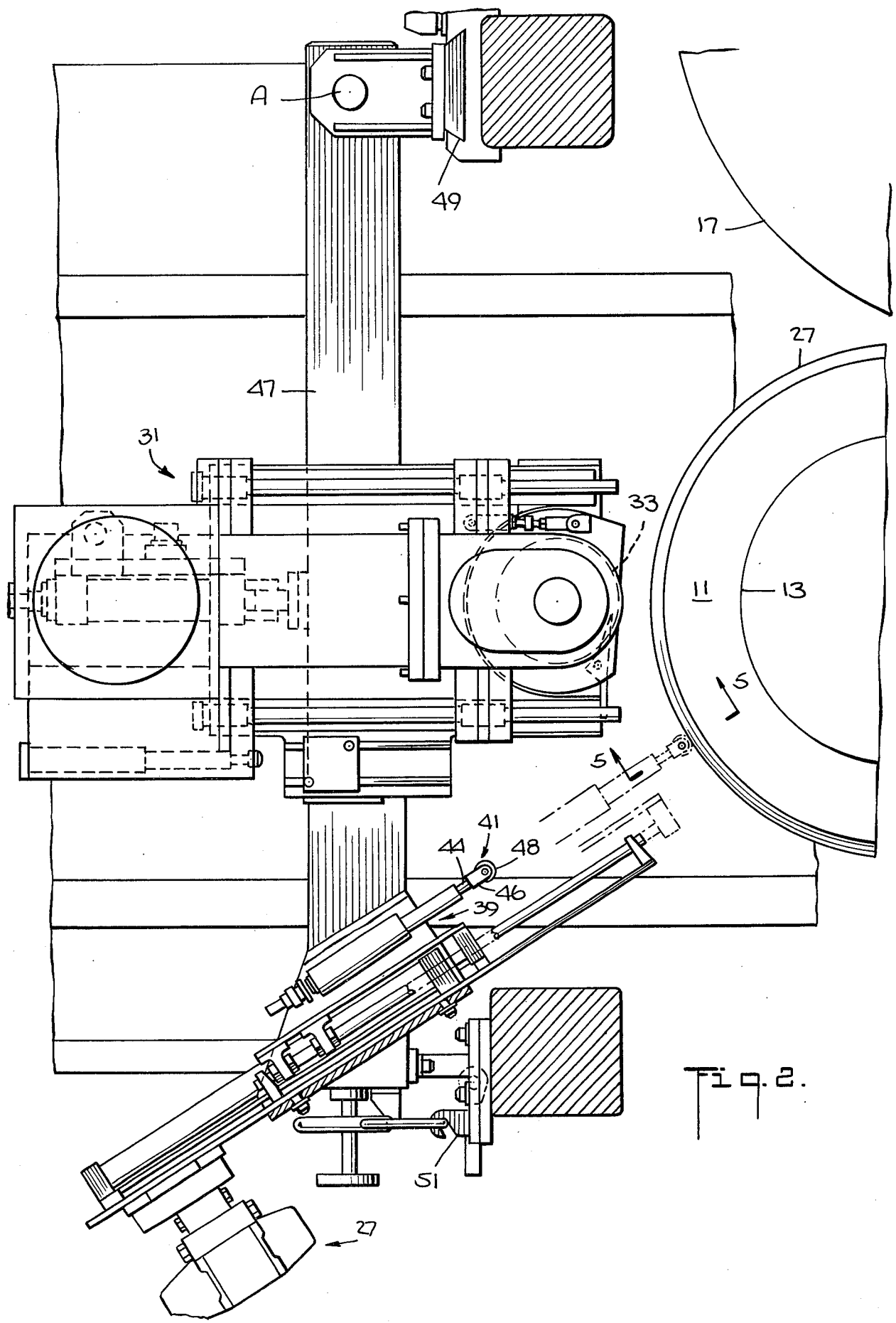

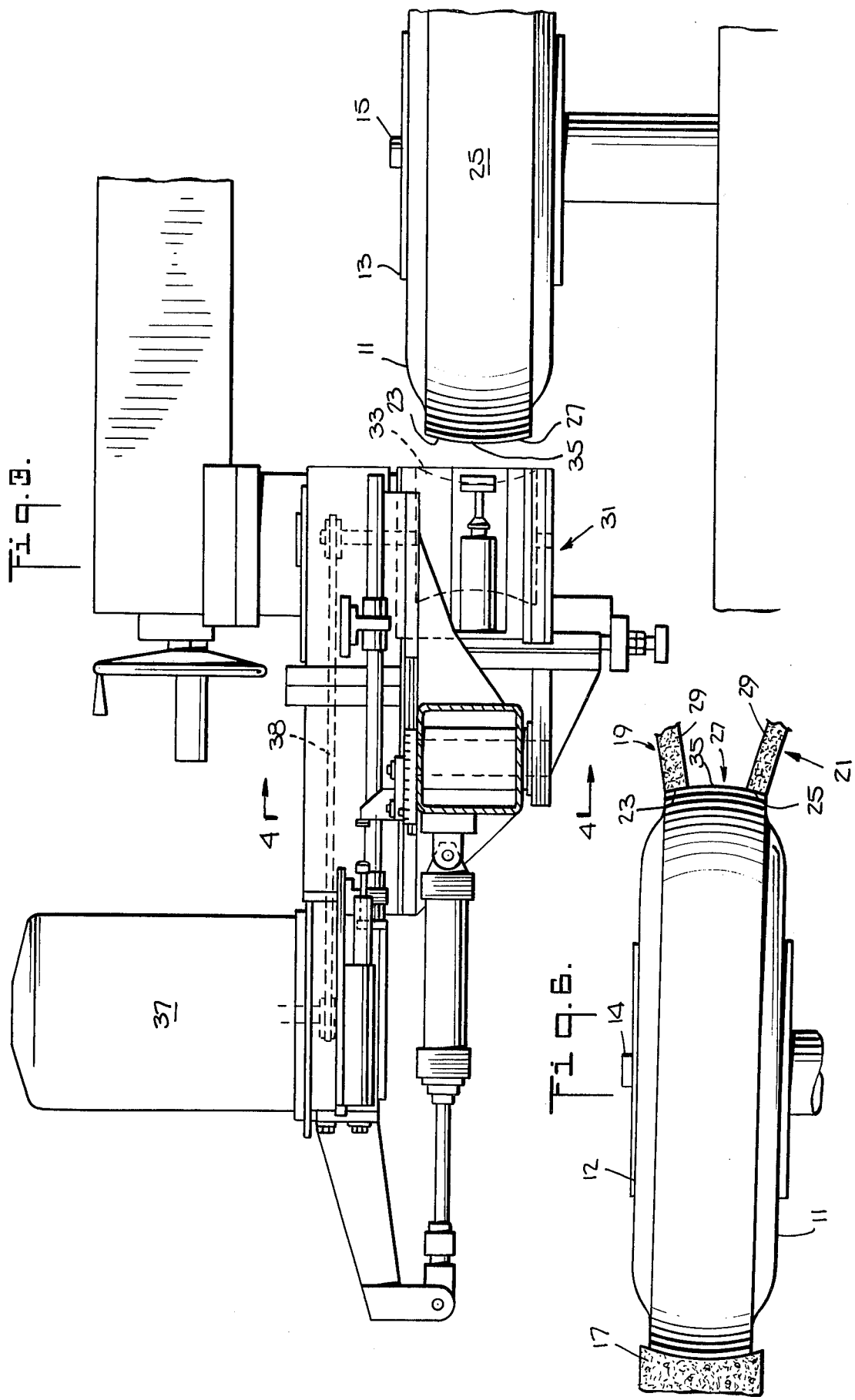

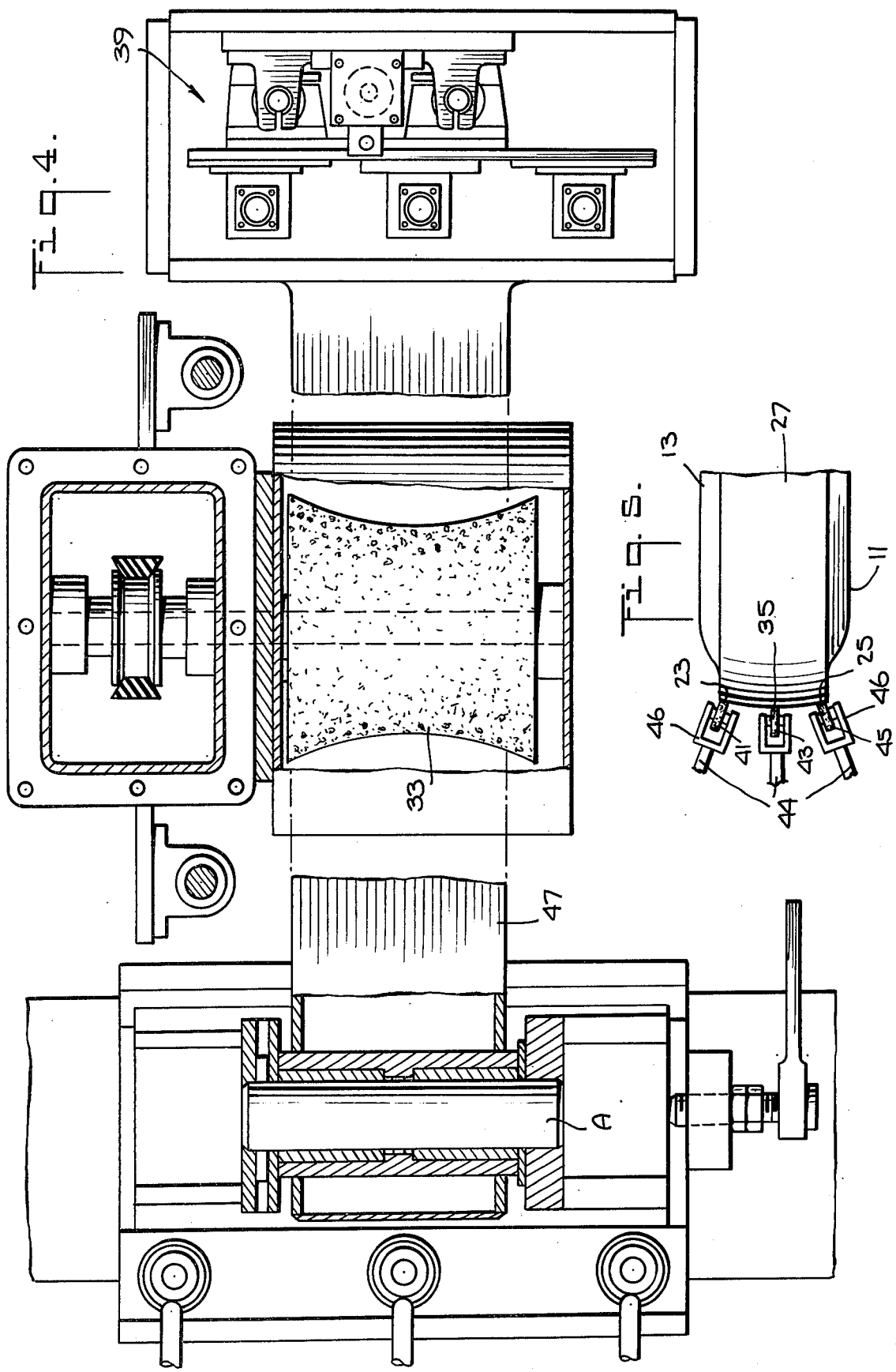

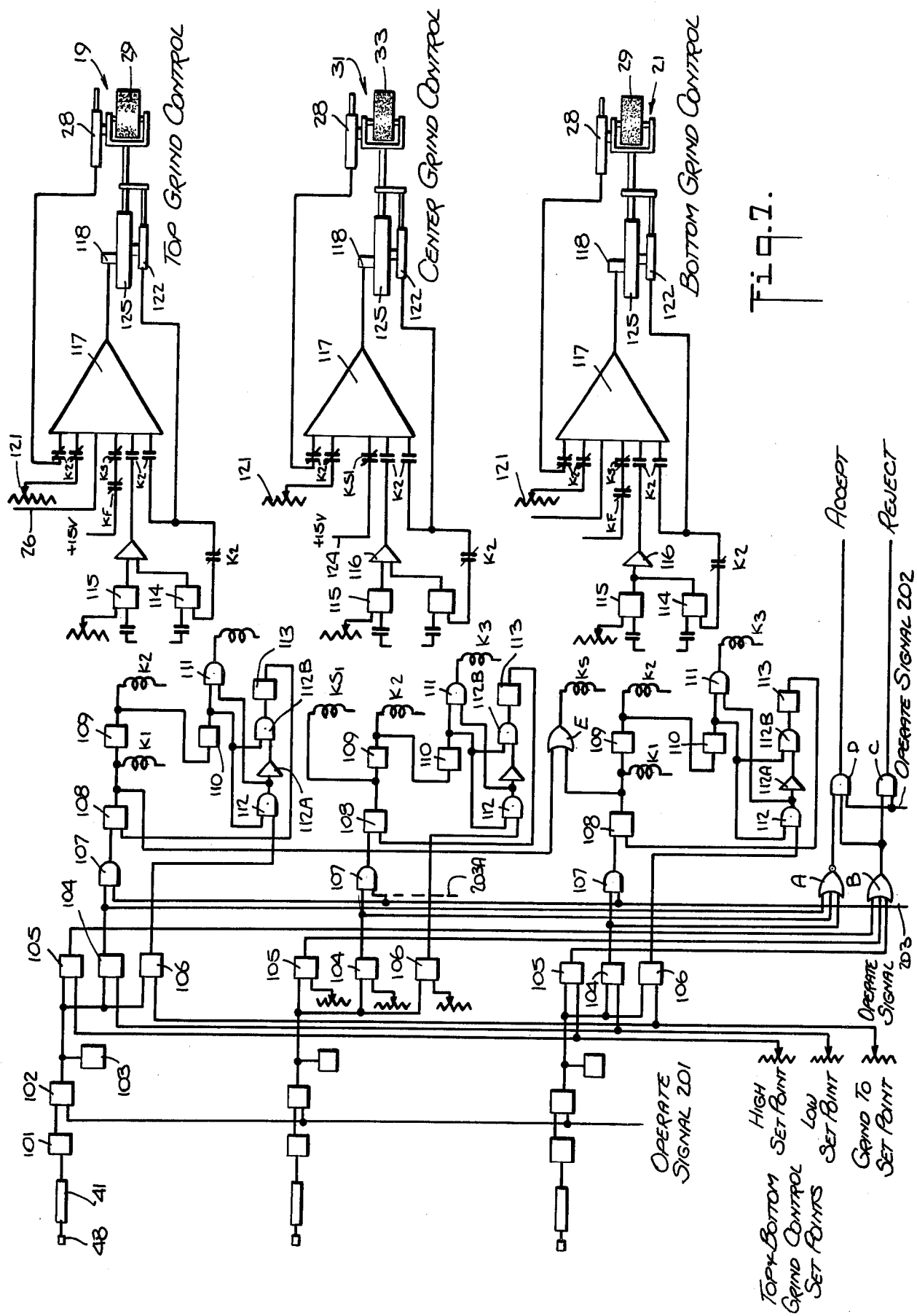

APPARATUS FOR IMPROVING TIRE UNIFORMITY

This is a division of application Ser. No. 491,979, filed July 26, 1974 which issued June 15, 1976 as U.S. Pat. No. 3,963,427.

BACKGROUND OF THE INVENTION

The instant invention relates to improving the uniformity of a pneumatic tire by measuring and correcting excessive variation in the free radial run-out of the tire during such rotation of the tire.

Various constructions of pneumatic vehicle tires are well known. Ideally, these well-known constructions will yield tires which are quite uniform. It is recognized, however, that during the manufacturing process some deviations from the ideal occur. Experience has shown that minor deviations can be tolerated and do not contribute, to any significant degree, to an objectionable level of non-uniformity such as would adversely affect the ride quality of the tire. However, when deviations exceed certain levels, they will have an adverse affect on the ride and handling characteristics of the vehicle on which they are mounted.

One source of tire non-uniformity is the variation in the forces which are exerted radially between the tire and the road surface as the tire rolls along such surface under a normal load. These variations are usually described as radial force variations. Another source of non-uniformity is the eccentricity of the tire, that is, its deviation from a perfect circle. This eccentricity is also known as free radial run-out. Measurements to determine the deviation in the eccentricity of the tire are taken at the surface of the tread, usually at the shoulders and center. If these measurements exhibit excessive variations, they can be corrected to an acceptable level by a process of grinding the tread in the areas of maximum radial deviation. This method of correcting non-uniformity is quite satisfactory but does not remove all tire anomalies that contribute to or cause unsatisfactory rides and failing conditions.

The tire industry has adopted a sophisticated and expensive method of correcting tire non-uniformities that are attributable to the variations in radial force and has ignored, generally, the radial run-out quality of the tire. The devices for measuring and correcting radial force variations in a tire are well known in the tire art and are usually identified as tire uniformity graders (TUG) or tire uniformity optimizers (TUO). Such devices usually include a wheel and axle assembly on which the tire to be evaluated is mounted and a test-wheel in contact with the tire. The tire is forcibly held against the test-wheel, the applied force thereby providing a predetermined load on the tire, and when the test-wheel is rotated, the tire rotates with it. As the tire rotates, the variation in the radial force on the axle on which the tire is mounted is measured. Correction for excessive variation in radial forces usually involves grinding tire tread around its circumference along one or both shoulders at selected areas.

In most cases where tire manufacturers have adopted radial force variation correction machines, correction for radial run-out has been abandoned because of the added expense of an additional processing step and the probability of correcting one area of tire non-uniformity at the expense of another by grinding the tire tread by two independent and separate means. In other words, regardless of which of the two correction methods were to be used first, both correction methods grind the tire in selected areas. It is probable that after a tire is corrected for radial force variation, the subsequent radial run-out correction may create new objectionable radial forces. If the radial run-out were corrected first, the subsequent radial force correction may cancel the benefit of the radial run-out correction. Unfortunately, the radial force variations and the radial run-out variations of a tire do not occur, necessarily, in the same place on the tire. In other words, correcting for one will not necessarily correct for the other.

Automobile manufacturers are now demanding that tires supplied to them meet certain uniformity criteria. Accordingly, they require data certifying that the tires supplied to them meet their prescribed limits for radial run-out variation as well as radial force variation. Therefore, the instant invention is designed for operation on existing tire uniformity machines (for radial force variation measurement and correction) to provide measurement and correction for variation in free radial run-out. Existing tire uniformity machines are equipped with shoulder grinders for radial force variation correction. This invention modifies existing uniformity machines by providing a concentric grinder at the tread center and a three point probe for free radial run-out detection. Existing tread shoulder grinders are modified with sensors and a concentricity measuring system.

SUMMARY OF THE INVENTION

The invention eliminates the need for a separate concentricity (run-out) grind operation and the operating personnel required to perform it by combining both radial force and radial run-out correction into one operation. The instant invention minimizes the removal of excess rubber by grinding the tread selectively so as to insure conformance to prescribed uniformity levels for both radial force variation and radial run-out variation without sacrificing one for the other. The instant invention also reduces the level of tire rejects by maximizing the uniformity of the tire.

It is an object of the instant invention to provide apparatus for measuring both radial force variation and radial run-out variation in a tire operating under load and, as necessary, correcting either or both of such variations in a single operation.

A further objective is to provide apparatus to correct excessive radial force variation without adversely affecting radial run-out variation, and to correct excessive radial run-out variation without adversely affecting radial force variation.

Another objective of the invention is to modify existing radial force variation correction machinery to enable the same to make radial run-out variation corrections simultaneously with the radial force variation corrections.

The instant invention meets the above objectives of providing a method and apparatus for simultaneously improving tire uniformity with respect both to radial force variation and free radial run-out.

The method comprises continuously rotating the tire about its own rotational axis under a constant, normal load, measuring the variation in the forces generated in the radial direction around the circumference of the tire tread, grinding either or both tread shoulders, if necessary, to correct excessive variation in the radial forces, measuring along both shoulders and the center of the tire tread the variation in the free radial run-out of the tire, and grinding either or both shoulders and/or the center of said tire tread, if necessary, to correct excessive variation in the free radial run-out of the tire.

BRIEF DESCRIPTION OF THE DRAWINGS

FIG. 1 is a top plane view of the apparatus employed in the instant invention;

FIG. 2 is an enlarged, fragmentary top plan view of the apparatus shown in FIG. 1;

FIG. 3 is an enlarged, sectional view taken on the plane indicated by the line 3—3 in FIG. 1;

FIG. 4 is an enlarged, sectional view, with parts broken away for clarity, taken on the plane indicated by the line 4—4 in FIG. 3;

FIG. 5 is an enlarged, sectional view taken on the plane indicated by the line 5—5 in FIG. 2;

FIG. 6 is an enlarged, sectional view taken on the line 6—6 in FIG. 1; and

FIG. 7 is a schematic, block diagram of the circuitry used in the apparatus shown in FIG. 1.

DESCRIPTION OF THE PREFERRED EMBODIMENT

FIG. 1 shows the salient features of the preferred embodiment of the apparatus employed in the instant invention for measuring and correcting variations in both the free radial run-out and the radial forces of a pneumatic tire generally designated 11. The tire 11 is mounted on a wheel rim 13 which is rotatable on an axle 15. The apparatus includes a road or load wheel 17 which applies a load normal to the tire 11 and is rotated by the tire 11 during the measuring and correcting procedures, to be discussed hereinbelow. Top and bottom shoulder grinders 19 and 21 respectively, shown generally in FIGS. 6 and 7, are provided for removing material from either or both of the corresponding shoulders 23 and 25 (FIG. 6) of the tread 27 of the tire 11. Each of the shoulder grinders 19 and 21 is provided with tracking sensor 28 (see FIG. 7) and a rotatable grinding wheel 29 driven by a motor 37 via a drive train including a drive timing belt 38 (FIG. 1).

A center grinder, shown generally at 31, having a rotatable grinding wheel 33, is provided for removing material from the central portion 35 (FIGS. 3 and 6) of the tire tread 27. The wheel 33 is driven by a motor 37 via a drive train including the drive timing belt 38 (see FIG. 3). A sensor assembly, shown generally at 39 (FIG. 1) and having top, center and bottom radial run-out probes 41, 43 and 45 (see FIG. 5), respectively, is provided for continuously contacting the tire tread 27 and measuring free radial run-out along the shoulders and center of the tread 27. Each of the probes 41, 43 and 45 includes a shaft 44 having attached thereto a clevis 46 which has a small roller or skid 48 mounted between its forked parts. The center grinder 31 and the sensor assembly 39 are secured to a support beam 47 which is pivotable at A from a gib 49 to permit the grinder 31 and sensor assembly 39 to be swung away from the operating position, illustrated in FIGS. 1 and 2, in order to permit servicing of the machine and adjustment of center grinder measuring probes. The support beam 47 is secured in its operating position by means of a releasable latch 51.

The method of operating the apparatus set forth above begins with conveying a tire to be measured to the center zone of the machine, then chucking the pneumatic tire 11 and loading the tire 11 by advancing the road wheel 17 against the tire 11 as shown in FIG. 1.

The measuring and grind control circuitry discussed below employs conventional logic elements, an explanation of which may be found in a publication by General Electric Company entitled "Transistorized Static Control". For additional understanding of logic circuits, it is suggested that reference be made to a publication entitled "Computer Circuits and How They Work" by Byron Wels, 1970. The electronic circuitry, depicted in FIG. 7, includes three basic channels, the top grind control, the center grind control and the bottom grind control. These channels, with some minor exceptions, are identical. For example, because of mechanical interferences, the top and bottom grinder must servo to the tire simultaneously. There is one circuit that handles this situation, and whenever a top and/or bottom shoulder grind is required, both shoulder grinders 19 and 21 will servo into the tire, although only one or both grinders will actually remove material from the tire tread 27.

In order to simplify discussion of the operation of the apparatus, the bottom grind control (for grinding the bottom shoulder 25) only will be discussed in detail for radial run-out variation correction. The center and top grind control will be self-explanatory after the discussion of the bottom grind control circuitry is completed.

When the tire 11 has started to rotate and stabilize about the axle 15, the bottom radial run-out probe 45 will advance to the tire 11. The probe 45 will stop when it is depressed approximately half way to the tire 11. This procedure is accomplished by conventional circuitry and will therefore not be discussed here.

Subsequent to the probe 45 advancing properly to the tire for measurement of the radial run-out, the electrical signal from the run-out probe 45, representing the tire eccentricity, is fed into a noise filter 101, whose purpose is to remove extraneous electrical noises that do not relate to the run-out of the tire.

It is important to emphasize that the run-out values are determined electrically by measuring the surface of a tire rotated through one revolution. These values are repeated with each tire revolution and result in a complex wave form which is a composite curve made up of combined frequencies. By installing a fundamental filter it is possible to extract the lowest possible frequency that exists, such as the first harmonic. Other filters can be added so that the invention will permit the selection and grading of tires to harmonics other than the first harmonic. For a more elaborate discussion of radial run-out measurement and the first harmonic component thereof, see U.S. Pat. No. 3,719,813, issued Mar. 6, 1973.

The electrical signal from the noise filter 101 is then fed into a run-out peak detector 102, the function of which is to store the peak-to-peak excursion of the varying wave as sensed by the run-out probe 45. This is accomplished when the operate signal 201 qualifies the run-out peak detector 102 to operate. The output of the peak detector 102 qualifies the digital display meter 103, which represents, visually, the run-out of the tire 11 and feeds comparators 104, 105 and 106.

The comparator 104 is called the low set point comparator and is set for the low limit of tire eccentricity. The function of the low set point comparator 104 is to determine whether the measured run-out value is above or below the accepted limit without grinding. If it is below the accepted limit, there will be no output from the comparator 104 and the tire will be accepted without grinding. If the run-out value is above the accepted limit of comparator 104 but below the limit for comparator 105 which is set for the high limit, the comparator 104 will classify the tire into a grind category. Comparator 105 is the upper limit of the grind range, so that if the radial run-out exceeds this upper limit, comparator 105 will classify the tire a reject and the tire will not be ground.

Comparator 106 is the grind-to set point. When a grind is called for, the grind control is normally set to a limit, called the grind-to-set point, somewhat below the low set point. This adjustment causes slight additional grinding which will change the run-out to where it will not be rejected by subsequent grinding for radial force variation, if such radial force variation grinding is necessary.

The signal from the low set point comparator 104 is fed into the accept NOR circuit A. If the low set point comparator 104 is not qualified, there will be an output from circuit A. The signal from the high set point comparator 105 is fed into the reject OR circuit B. If the input signal into comparator 105 does not exceed the high set point comparator 105, there will be no input signal to OR circuit B, thus indicating no rejection of the tire. When chucking a tire, if the low set point comparator 104 operates and the high set point comparator does not operate, the tire falls into a grind category. The output of accept circuit A or reject circuit B qualifies one input of circuit D and C respectively. If either circuit is qualified when operate signal 202 is present, which is approximately three seconds after operate signal 201 occurs, the tire will automatically be accepted or rejected and no further action with grinding for radial run-out variation would result.

When the low set point comparator 104 is exceeded but the high set point comparator 105 is not exceeded, the tire is a candidate for grinding, as explained above. There would be no output from circuit C or D when operate signal 202 is present indicating neither an accept nor reject tire. At this point, operate signal 203 would operate qualifying circuit 107. The combined signal from the low set point comparator 104 and the operate signal 203 would cause an output from circuit 107 which would qualify grind control flip-flop circuit 108.

The output from flip-flop circuit 108 qualifies OR circuit E which operates relay KS. The function of relay KS is to remove the bias on the servo amplifier 117 which will provide a signal to the servo valve 118, thereby causing the hydraulic cylinder rod 125 to advance, thereby moving the grinder 21 and the tracking sensor 28 to the tire 11. When the grinder 21 and the tracking sensor 28 reach the tire 11, the tracking sensor 28 will feed an electrical signal back to the servo amplifier 117 causing the grinder 21 to track the tire at a position selected by a skim adjust control 121. At this point in time, the grinder 21 will continue to track the tire 11. Circuit 108 will also qualify relay K1 which, in turn, will qualify circuit 114, the run-out high point peak detector. The function of circuit 114 is to establish the high point position of the tire electrically and store the signal therefor as the grinder reference position signal. This is accomplished with the help of grind position sensor 122 which sends an electrical signal into circuit 114. When relay K1 operates, circuit 114 is qualified to operate and store the run-out high point electrical signal. Circuit 108 also qualifies a timer circuit 109, whose function is to allow the grinder 21 to servo in and properly track the tire 11.

Once timer 109 times out, the output therefrom will operate relay K2, the function of which is to transfer the grinder control from the tracking system to a position control system. This is accomplished when relay K2 opens the tracking circuitry input to the servo amplifier 117 and closes the position control circuitry input to the servo amplifier 117. Relay K2 also switches the grinder position sensor 122 from the high point peak detector circuit 114 to the servo amplifier 117. The output of the timer circuit 109 qualifies a second timer circuit 110, whose function is to allow for the tracking and position control circuitry to transfer and for the grinder 21 to stabilize to the position control. When the second timer circuit 110 times out, the output from timer circuit 110 qualifies and circuit 111. The output from circuit 111 operates relay K3, the function of which is to qualify the start grind feed rate generator circuit 115. The function of circuit 115 is to generate an electrical signal that will cause the grinder 21 to advance to the tire 11 in small increments. The outputs of circuits 114 and 115 feed into summing amplifier circuit 116. The output of the summing amplifier 116 feeds into the main servo amplifier 117 which operates the servo valve 118 and which, in turn, controls the positioning of the hydraulic cylinder 125 which, in turn, positions the grinding wheel 29.

Prior to the feed rate generator circuit 115 being qualified, the position of the grinder 21 is maintained by an electrical signal from circuit 114 which represents the high point of the tire. As explained above, this signal feeds into the summing amplifier circuit 116, the output of which is fed directly into the servo amplifier 117. After the relay K3 operates, the feed rate generator circuit 115 will generate an electrical staircase signal that will cause the output of the summing amplifier 116 to increase. For each step of the staircase signal from the circuit 115, the output of the summing amplifier circuit 116 will be increased, causing the grinder 21 to advance to the tire 11. While the grinder 21 is advancing toward the tire 11, the grinder position sensor 122 will feed an electrical signal back to the servo amplifier 117 indicating to the amplifier 117 that the grinder 21 has moved the selected amount. This signal will cause the output of the servo amplifier 117 to approach zero, causing the grinder 21 to stop advancing. This sequence continues advancing the grinder 21 in incremental steps until the measured radial run-out of the tire 11 is acceptable, or until the grinding is inhibited by maximum grind time limitation.

During the time the grinding occurs, operate signal 201 will sequence off and on, updating the runout peak detector 102. The output of the run-out peak detector 102 feeding into the comparators 104, 105 and 106 will continually update the comparators with the new run-out signal level. As grinding continues, eventually the grind-to comparator 106 will turn off, disabling an AND circuit 112, which in turn de-energizes the relay K3. De-energizing the relay K3 will cause the feed rate generator circuit 115 to stop generating the staircase signal. At this point, the grinder 21 will dwell without further advancing against the tire 11. Also, the AND circuit 112 will qualify inverter circuit 112a, which in turn will qualify AND circuit 112b. The output of the AND circuit 112b will qualify a third timer circuit 113, the function of which is to allow the grinder 21 to dwell before resetting the grind control flip-flop circuit 108. When the timer circuit 113 times out, the output will reset the grinder control flip-flop circuit signal 108, which in turn, will de-energize relays KS, K1 and K2, thereby causing the grinder 21 to retrack from the tire 11 and resulting in a complete reset of all grind control circuitry.

The foregoing explanation constitutes the basic theory of operating both of the shoulder grinders 19 and 21 for radial run-out variation correction. Although control of only the bottom grinder 21 has been discussed, it is understood that whenever a grind by either the bottom grinder 21 or the top grinder 19 is required, that both grinders will servo into the tire 11. The signal that accomplishes this is the output signal from the OR circuit E, which qualifies relay KS. When the relay KS operates, the top and bottom servo amplifier signal 124 is removed. Both the top and bottom grinders 19 and 21 respectively will servo into the tire 11. However, without a signal from the grind flip-flop circuit 108, the grinder wheel 29 would remain retracted from the tire 11.

The center grinder 31 operates in the same manner as the shoulder grinders 19 and 21. However, as relays KS and K1 are represented for the shoulder grinders 19 and 21, the center grinder control is represented by relays $KS_1$. This is the only difference between the center grinder control and the shoulder grinder controls. All the other functions occur as described for the bottom grinder 21. The bottom grinder 21 or the top grinder 19 can be called upon to grind with or without center grinder 31 operating. The grinders are independently controlled. However, as explained above, the shoulder grinders 19 and 21, due to mechanical interferences, must servo in together even though only one of the grinders may grind.

The circuitry, as explained above, describes the sequence of operation of the grinders for radial run-out control only. However, the grinder system of the instant invention is designed to do radial run-out and/or radial force grinding. When radial force grinding is required, force grind signals are fed into the servo amplifier 117. It should be noted that force grinding occurs normally on the shoulders of the tire tread, and only this will be discussed. However, with the center grinder attachment force grinding can be done on the center of the tire, if desired. A force grind control signal will operate relays KF to remove the bias signals 124 to the servo amplifiers 117, thereby causing the top and bottom grinders 19 and 21 to servo into the tire 11 and track said tire. Force grinding will occur when the force grind signals are received via force grind control lines 26 to the servo amplifier 117.

The force variation control signal is superimposed on the signal from the tracking sensor 28 and the grinders 19 and 21 will follow the force control signal which is already in the machine control system. This force measuring system is old in the art, so that further discussion is deemed unnecessary. By providing the proper force grind signal delay, the center grinder could be used for force grinding as well as radial runout grinding.

The preferred sequence of measuring and correcting for excessive radial run-out variation and radial force variation is as follows: After the tire 11 has been properly inflated and stabilized, measurement for radial force variation is taken with the tire 11 having counterclockwise rotation. Upon completion of the first rotation force measurement, the tire 11 will come to a stop and thence commence clockwise rotation. After stabilizing in a clockwise rotation, the run-out probes 41, 43 and 45 will advance to the tire 11 to make a run-out measurement. After stabilizing, the run-out measuring electronics will be qualified and if the tire 11 requires run-out correction, the grinders will servo into the tire 11 as previously discussed, and the runout correction will be accomplished at this time. Upon completion of the run-out correction, the grinders will continue tracking the tire. The clockwise force variation test is then made. If force variation correction is required, the force variation control signal is fed by way of the force grind control lines 26 into the servo amplifier 117 as previously discussed. These signals are initiated in the measuring computer section of the apparatus. As the force variation grind correction continues, the tire radial run-out is continually monitored by the radial run-out probes 41, 43 and 45. In the event that the force grinding caused an adverse effect on the radial run-out of the tire such as to exceed the run-out acceptable limit, the force grinding would be stopped and the tire would be identified appropriately and rejected. Upon completion of the force variation grinding, the grinders will be retracked from the tire and the tire will be deflated and transferred to another station.

An alternative sequence for measuring and correcting for both excessive radial run-out and excessive radial force variation comprises measuring the force variation in a counterclockwise rotation and then stopping the rotation and then commencing rotation in a clockwise direction. At this time, the run-out probes 41, 43 and 45 are advanced to the tire 11 and stabilized. The clockwise force variation measurements and the run-out measurements are then made at this time simultaneously. If it becomes necessary to grind a tire for excessive force and/or run-out variation, shoulder grinders will grind the tire for force variation correction first, and if center grinding for run-out variation correction is required, the center grinder will commence grinding. Upon completion of the force grinding at the shoulders, the shoulder grinders will be switched into a run-out grind mode, if necessary. To accomplish this function, a slight change in the circuitry as described above would be necessary. The circuit change would be to add a separate control signal 203A for the center grinder 31 going into the qualifying circuit 107, and to remove the operate signal 203 from the qualifying circuit 107 for the center grind control. Operate signal 203A would be initiated at the same time the second force measurement and run-out measurements are completed. This allows the center grinder 31 to be operated independently from the shoulder grinders via operate signal 203A. By the same token, operate signal 203, which qualifies the shoulder grinders to operate in the run-out mode, if required, will be inhibited at this time. At the completion of the force grinding, operate signal 203, if required, will be initiated to allow the shoulder grinder to switch from force grinding to run-out grinding. Upon completion of the acceptance of force and/or run-out grinding on the shoulders, the tire will be deflated and transferred to another station.

It should be noted that the specific sequence of operation is not critical so long as all the functions are accomplished.

The invention disclosed will have many modifications which will be apparent to those skilled in the art in view of the teachings of this specification. It is intended that all modifications which fall within the true spirit and scope of this invention be included within the scope of the appended claims.

What is claimed is:

1. Apparatus for improving the uniformity of an inflated, pneumatic tire in a continuous operation while the tire is continuously rotating, comprising:
    means for simultaneously and continuously measuring both the variation in the free radial run-out of the tire along both shoulders and the center of the tire tread and the variation in the forces generated in the radial direction around the circumference of the tire tread;
    a pair of grinders electrically connected to the radial force variation measuring means and to the means for measuring the free radial run-out of the shoulders of the tire, said grinders being situated adjacent the shoulders of the tire and capable of moving to the shoulders for grinding either or both of said shoulders for correction of excessive variation in the free radial run-out or radial forces thereof; and
    a third grinder electrically connected to the means for measuring the free radial run-out of the center of the tire, said third grinder being situated adjacent the center of the tire tread and capable of moving to the center of the tire tread for grinding said center for correction of excessive variation in the free radial run-out thereof.

2. The apparatus of claim 1, wherein the radial run-out measuring means includes a fundamental filter for extracting the first harmonic component of said run-out.

3. The apparatus of claim 1, wherein the radial run-out measuring means includes means for either accepting or rejecting the tire or classifying the tire into a grind category.

4. The apparatus of claim 3, wherein the shoulder grinders and the center grinder each includes a tracking sensor.

5. The apparatus of claim 4, further comprising means for advancing the grinders to the tire tread in small increments.

6. The apparatus of claim 5, further comprising means for terminating the radial run-out grinding when the radial run-out variation reaches an acceptable level or when a maximum grind time is exceeded.

7. The apparatus of claim 6, further comprising means for continually measuring the free radial run-out during the grinding to correct excessive variation in the free radial run-out.

8. The apparatus of claim 1 wherein the center grinder is also connected to the radial force variation measuring means.

* * * * *